United States Patent
Leung et al.

(10) Patent No.: US 10,300,386 B1
(45) Date of Patent: May 28, 2019

(54) CONTENT ITEM INSTANCE SCALING BASED ON WAIT TIME

(71) Applicant: Amazon Technologies, Inc., Seattle, WA (US)

(72) Inventors: Hok Peng Leung, Redmond, WA (US); Zane Grey Reynolds, Seattle, WA (US); Christopher David Byskal, Issaquah, WA (US); Geoffrey Scott Pare, Seattle, WA (US); Christopher Paul Dury, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 15/190,611

(22) Filed: Jun. 23, 2016

(51) Int. Cl.
*A63F 13/48* (2014.01)
*A63F 13/60* (2014.01)

(52) U.S. Cl.
CPC .............. *A63F 13/60* (2014.09); *A63F 13/48* (2014.09)

(58) Field of Classification Search
CPC ....................................................... A63F 13/48
See application file for complete search history.

(56) References Cited

U.S. PATENT DOCUMENTS

| | | | | |
|---|---|---|---|---|
| 9,256,452 B1* | 2/2016 | Suryanarayanan | ..... | G06F 9/455 |
| 2012/0102185 A1* | 4/2012 | Fernandes | ............... | H04L 67/38 |
| | | | | 709/224 |
| 2014/0139614 A1* | 5/2014 | Swanson | ................ | H04N 7/152 |
| | | | | 348/14.08 |
| 2014/0180848 A1* | 6/2014 | Argue | .................. | G07G 1/0036 |
| | | | | 705/16 |
| 2014/0228108 A1* | 8/2014 | Bruno, Jr. | ............... | G06F 12/00 |
| | | | | 463/29 |
| 2014/0258546 A1* | 9/2014 | Janssens | ............... | G06F 9/5088 |
| | | | | 709/226 |
| 2015/0019271 A1* | 1/2015 | Abuelsaad | ............. | G06Q 50/12 |
| | | | | 705/5 |
| 2015/0057084 A1* | 2/2015 | Lin | ....................... | A63F 13/795 |
| | | | | 463/42 |
| 2015/0331703 A1* | 11/2015 | Kelly | .................. | G06F 9/45558 |
| | | | | 718/1 |
| 2016/0256784 A1* | 9/2016 | Schultz | ................... | A63F 13/79 |

* cited by examiner

*Primary Examiner* — Jay Trent Liddle
(74) *Attorney, Agent, or Firm* — BakerHostetler

(57) ABSTRACT

Techniques for wait time based scaling of content item instances are described herein. In some examples, a customer of a computing service provider may select a wait time threshold for joining one or more of the customer's content items that are hosted by the computing service provider. When a joining user logs-in and requests to join a content item, a calculation may be made regarding an estimated wait time for the user to join one or more existing content item instances. The estimated wait time may then be compared to the wait time threshold. A determination may then be made regarding whether or not to launch a new content item instance in response to the user's join request. In some examples, this determination may be based, at least in part, on the comparison of the estimated wait time to the wait time threshold.

20 Claims, 9 Drawing Sheets

CONTENT ITEM INSTANCE SCALING BASED ON WAIT TIME

BACKGROUND

Computing service providers may operate server-based (e.g., cloud-based) systems that host electronic content items, such as video games, that are accessed by large numbers of players or other users. In some examples, content item instances may be executed using a number of virtual machines operated by a computing service provider. Customers of a service provider, such as game developers, may often pay a fee for having their video games or other content hosted on the service provider's systems. This fee may often be based various factors including, for example, a number of content item instances that are allocated to a customer for executing the customer's content over time. Thus, in order to help reduce costs for a customer, it may sometimes be advantageous to attempt to allocate to the customer, at any given time, as few content item instances as necessary in order to satisfy the users of the customer's hosted content. However, attempting to reduce or minimize a customer's number of allocated content item instances while also satisfying users may often prove to be a difficult and frustrating task that involves many trade-offs. For example, customers may often attempt to reduce costs by requesting fewer allocated content item instances, but this may result in situations in which users logging-on to the system are forced to experience long wait times in order for an instance of the content item to become available. This may reduce user satisfaction, lower the user's enjoyment and appreciation of the content, and reduce demand. By contrast, in some examples, customers may attempt to improve user satisfaction by requesting greater quantities of allocated instances, but this may result in increased costs and reduced efficiency, for example when allocated instances are not being used to an appropriate capacity.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
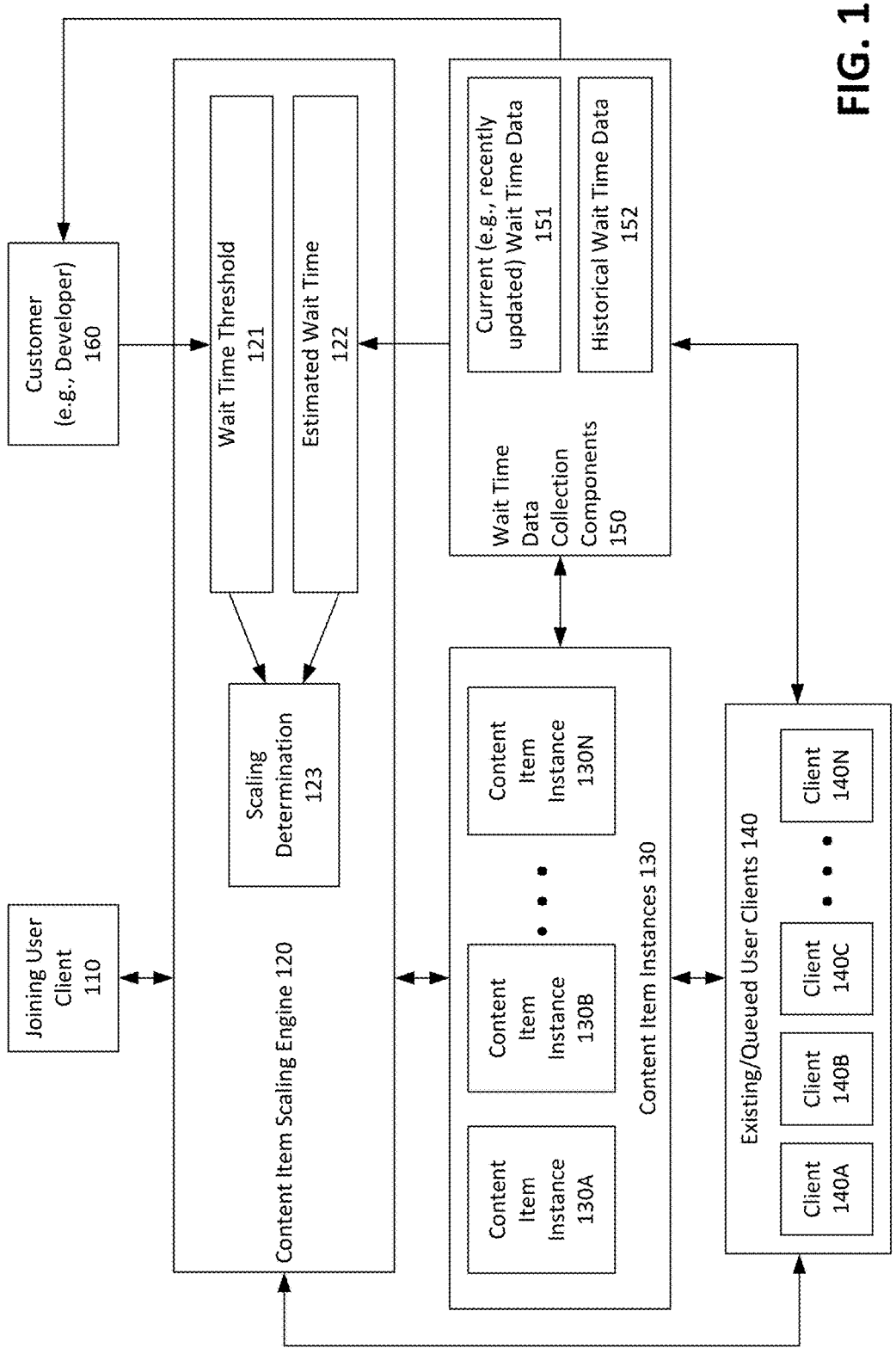
FIG. 1 is a diagram illustrating an example wait time based content item instance scaling system that may be used in accordance with the present disclosure.

Techniques for wait time based scaling of content item instances are described herein. In some examples, a computing service provider may operate server-based (e.g., cloud-based) systems that host electronic content items, such as video games, which may be accessed by large numbers of players or other users. The techniques disclosed herein may, for example, be employed to intelligently scale a quantity of content item instances that are allocated to game developers and other customers of the computing service provider. As set forth above, such customers may pay fee for having their content hosted on the service provider's systems, and this fee may be based, at least in part, on the quantity of content item instances allocated to the customers. In some cases, the disclosed techniques may help to manage costs for customers of the computing service provider while also improving efficiency and alleviating long wait times for players and other users of the hosted content.

In particular, in some examples, a game developer or other customer may select a wait time threshold for joining one or more of the customer's content items. As will be described in detail below, in some examples, the wait time threshold may be associated with a maximum wait time that a joining user may typically be required to wait in order to join one of the customer's content items. In some cases, the wait time threshold may be determined based on a trade-off between customer costs and user satisfaction. Specifically, in some cases, selection of a longer wait time threshold may generally reduce the quantity of content item instances allocated to the customer over time, thereby reducing customer costs. However, a longer wait time threshold may also generally result in longer wait times for joining users, which may reduce user satisfaction. By contrast, selection of a shorter wait time threshold may generally increase the quantity of content item instances allocated to the customer over time, thereby increasing customer costs. However, a shorter wait time threshold may also generally result in shorter wait times for joining users, which may generally improve user satisfaction. While selection of a wait time threshold may involve trade-offs such as those described above, it is expected that allowing customers to select a desired wait time threshold may generally be beneficial to customers, for example by allowing customers to flexibly control such trade-offs at levels that are best suited to satisfy their particular preferences.

In some examples, when a joining user logs-in and requests to join a content item, a calculation may be made regarding an estimated wait time for the user to join one or more existing (e.g., currently executing) content item instances associated with the user's join request. The estimated wait time may then be compared to the wait time threshold. A determination may then be made regarding whether or not to launch a new content item instance in response to the user's join request. In some examples, this determination may be based, at least in part, on the comparison of the estimated wait time to the wait time threshold. For example, in some cases, if the estimated wait time meets or exceeds the wait time threshold, then a new content item instance may be launched in response to the join request, for example by allocating an additional virtual machine instance to the customer and launching the new content item instance on the additional virtual machine instance or by launching the new content item instance on an existing virtual machine instance already allocated to the customer and possibly already executing one or more other content item instances. The user may then be assigned to the new content item instance and/or queued with other waiting users. By contrast, in some cases, if the estimated wait time does not meet or exceed the wait time threshold, then a new content item instance may not be launched in response to the join request. In this scenario, the user may be assigned to one of the existing content item instances or another content item instance once a slot becomes available, for example when another user leaves or terminates a session with the content item instance.

In some examples, the calculation of the estimated wait time may be based on a number of different factors. In particular, in some cases, the estimated wait time may be calculated based on historical data collected over time as well as current (or nearly-current) data collected at (or recently before) the time of the join request. The factors used to calculate the estimated wait time may include, for example, a time of day, a day of the week, a date, a location associated with the joining user and/or at least one content item instance, a quantity of users of at least one content item instance, a quantity of available content item instances, an elapsed session duration of at least one user, an estimated session duration of at least one user, an elapsed duration of at least one content item instance, a number of other users waiting to join at least one content item instance, user game modes, time required to launch a new content item instance (e.g., spin-up time), one or more historical wait times (e.g., average wait times over one or more historical periods), historical user quantity data (e.g., at various times and elapsed content item instance durations), historical user session duration data, historical content item instance launch (e.g., spin-up) time data, and others.

Thus, by scaling content item instances based on wait time, the disclosed techniques may, for example, enable intelligent and efficient scaling determinations. For example, in some cases, the disclosed techniques may reduce costs for customers while also increasing user satisfaction. In particular, by determining to launch new instances when the estimated wait time meets or exceeds the wait time threshold, the disclosed techniques may improve user satisfaction, such as by helping to avoid long wait times for users, for example in periods of heavy demand. Additionally, by determining to not launch new instances when the estimated wait time does not meet or exceed the wait time threshold, the disclosed techniques may reduce customer costs, such as by generally reducing quantities of allocated instances over time. Moreover, the disclosed techniques may also improve efficiency by helping to ensure that executing content item instances maintain a desirable quantity of users.

FIG. 1 is a diagram illustrating an example wait time based content item scaling system that may be used in accordance with the present disclosure. As shown in FIG. 1, a number of content item instances 130A-N (collectively referred to as content item instances 130) may be executed, for example by a server-based (e.g., cloud-based) computing service provider. Content item instances 130 may, for example, be instances of a video game or other media item, business or productivity item, or other electronic content. In some examples, one or more content item instances 130 may be executed on a respective virtual machine instance. In some cases, content item instances 130 may be allocated to a customer 160, such as a video game or other content item developer. Also, in some cases, a computing service provider may host content item instances 130 on behalf of customer 160. As set forth above, in some examples, customer 160 may pay a fee for having its content items or other content hosted on the service provider's systems. As also set forth above, in some examples, this fee may be based, at least in part, on a number of content item instances that are allocated to a customer for executing the customer's content over time.

FIG. 1 also includes a number of existing and/or queued user clients 140A-N (collectively referred to as existing/queued user clients 140). Generally, each existing user client may be participating in a session (e.g., a video game session) with one of content item instances 130A-N. In some examples, existing user clients may connect and communicate with content item instances 130 using one or more communications networks, for example one or more local area networks (LAN's) or one or more wide area networks (WAN's) such as the Internet. Additionally, each queued user client may be queued, for example, in one or more waiting queues, to join and initiate a session with one of content item instances 130A-N once an open session slot becomes available (e.g., upon termination of an existing user's session). It is noted that, in some examples, a session waiting queue may include multiple waiting users, thereby potentially requiring multiple existing users to terminate sessions before slots are opened for all users in the waiting queue.

As also shown in FIG. 1, a joining user client 110 may issue a request to join a content item (referred to hereinafter as a join request). In some examples, the join request from joining user client 110 may be received by content item scaling engine 120. As will be described in detail below, content item scaling engine 120 may perform a scaling determination 123 related to the join request. In particular, scaling determination 123 may include a determination of whether to launch a new content item instance in response to the join request. In particular, when content item scaling engine 120 determines to launch a new content item instance in response to the join request, the joining user client 110 may be assigned to connect to the new content item instance and to have a session initiated with the new content item instance and/or queued with other waiting users. By contrast, when scaling engine 120 determines not to launch a new content item instance in response to the join request, the joining user client 110 may be assigned to connect to an existing content item instance 130A-N or another content item instance once an open slot becomes available for the joining user client 110. In some examples, the joining user client 110 may be placed into one or more queues for one or more of the existing content item instances 130A-N until an open slot becomes available.

As will also be described in detail below, scaling determination 123 may be performed based a comparison of an estimated wait time 122 with a wait time threshold 121. In particular, in some examples, wait time threshold 121 may be selected by customer 160. In some examples, wait time threshold 121 may be associated with a maximum wait time that a joining user may typically be required to wait in order to join one of the customer's content items. As set forth above, in some cases, the wait time threshold 121 may be determined based on a trade-off between customer (e.g., developer) costs and user (e.g., player) satisfaction. Specifically, in some cases, selection of a longer wait time threshold 121 may generally reduce the quantity of content item instances allocated to the customer over time, thereby reducing customer costs. However, a longer wait time threshold 121 may also generally result in longer wait times for joining users, which may reduce user satisfaction. By contrast, selection of a shorter wait time threshold 121 may generally increase the quantity of content item instances allocated to the customer over time, thereby increasing customer costs. However, a shorter wait time threshold 121 may also generally result in shorter wait times for joining users, which may generally improve user satisfaction.

Upon receiving the join request from joining user client 110, content item scaling engine 120 may calculate an estimated wait time 122 for the joining user client 110 to join one or more existing content item instances 130A-N. Upon its calculation, the estimated wait time 122 may then be compared to the wait time threshold 121. A scaling determination 123 may then be made regarding whether or not to launch a new content item instance in response to the join request from joining user client 110. In some examples, scaling determination 123 may be based, at least in part, on the comparison of the estimated wait time 122 to the wait time threshold 121. For example, in some cases, if the estimated wait time 122 meets or exceeds the wait time threshold 121, then a new content item instance may be launched in response to the join request, for example by allocating an additional virtual machine instance to the customer 160 and launching the new content item instance on the additional virtual machine instance or by launching a new content item instance on an existing virtual machine instance already allocated to the customer 160 and possibly already executing one or more other content item instances. The joining user client 110 may then be assigned to the new content item instance and/or queued with other waiting users. By contrast, in some cases, if the estimated wait time 122 does not meet or exceed the wait time threshold 121, then a new content item instance may not be launched in response to the join request. In this scenario, the joining user client 110 may be assigned to join one the existing content item instances 130A-N or another content item instance once a user slot becomes available.

Figure 2:
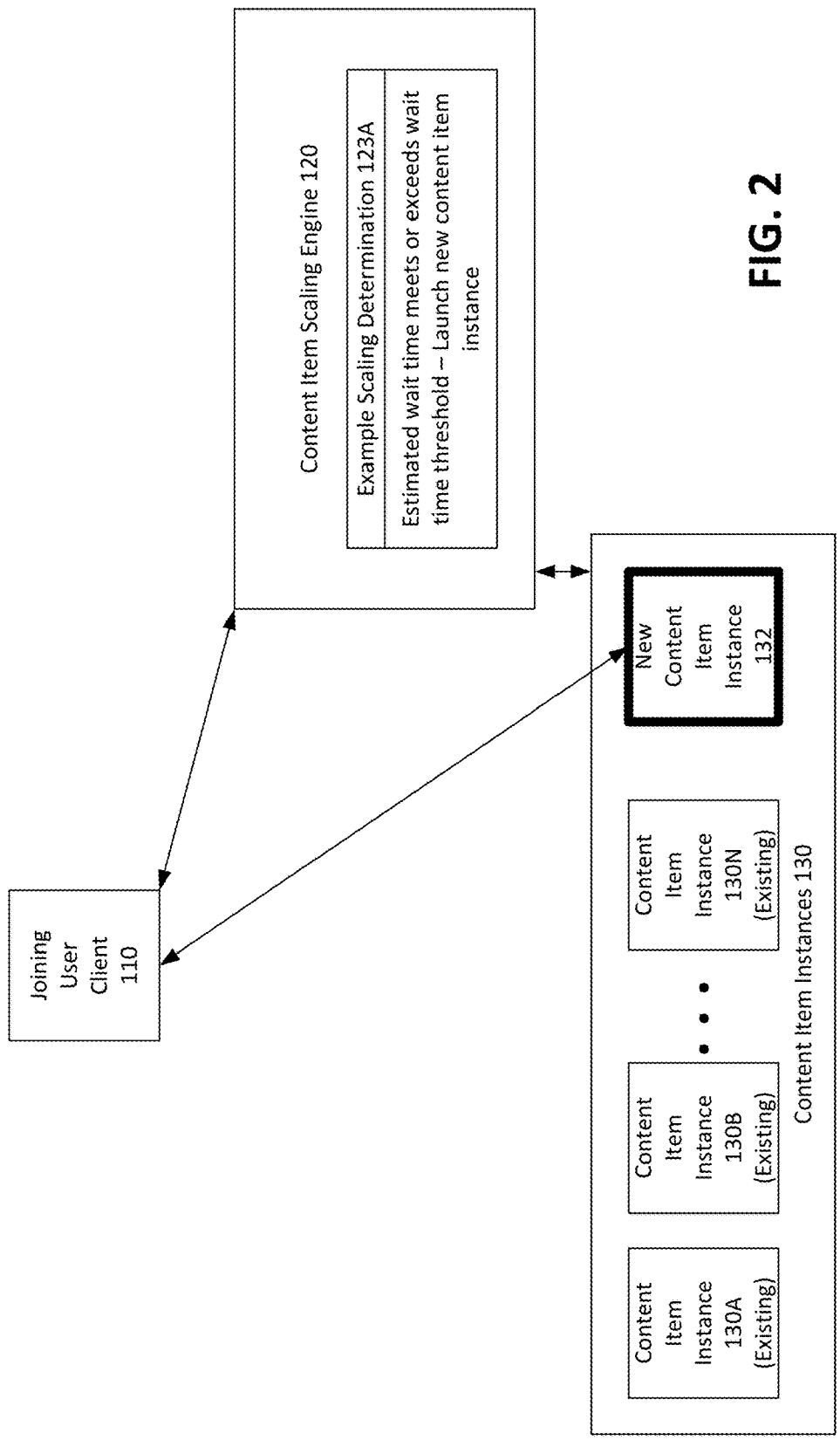
FIG. 2 is a diagram illustrating an example wait time based scaling determination that may be used in accordance with the present disclosure.

Referring now to FIG. 2, an example scaling determination 123A is shown in which content item scaling engine 120 determines that the estimated wait time 122 meets or exceeds the wait time threshold 121. In this example, scaling determination 123A may include a determination to launch a new content item instance in response to the join request from joining user client 110. In some cases, upon making this determination 123A, content item scaling engine 120 may provide instructions to allocate a new virtual machine instance to customer 160 and to launch a new content item instance 132 on the new virtual machine instance or to launch the new content item instance 132 on an existing virtual machine instance already allocated to the customer 160. Content item scaling engine 120 may also assign the joining user client 110 to the new content item instance 132 and provide instructions to joining user client 110 and/or new content item instance 132 to connect with one another and initiate a new user session for the joining user client 110 once the new content item instance 132 has been successfully launched and loaded. It is noted that, in some examples, the joining user client 110 may not immediately be assigned to the new content item instance 132 but may instead be added into a queue with other waiting users to join a next available content item instance, which may be the new content item instance or another content item instance.

Figure 3:
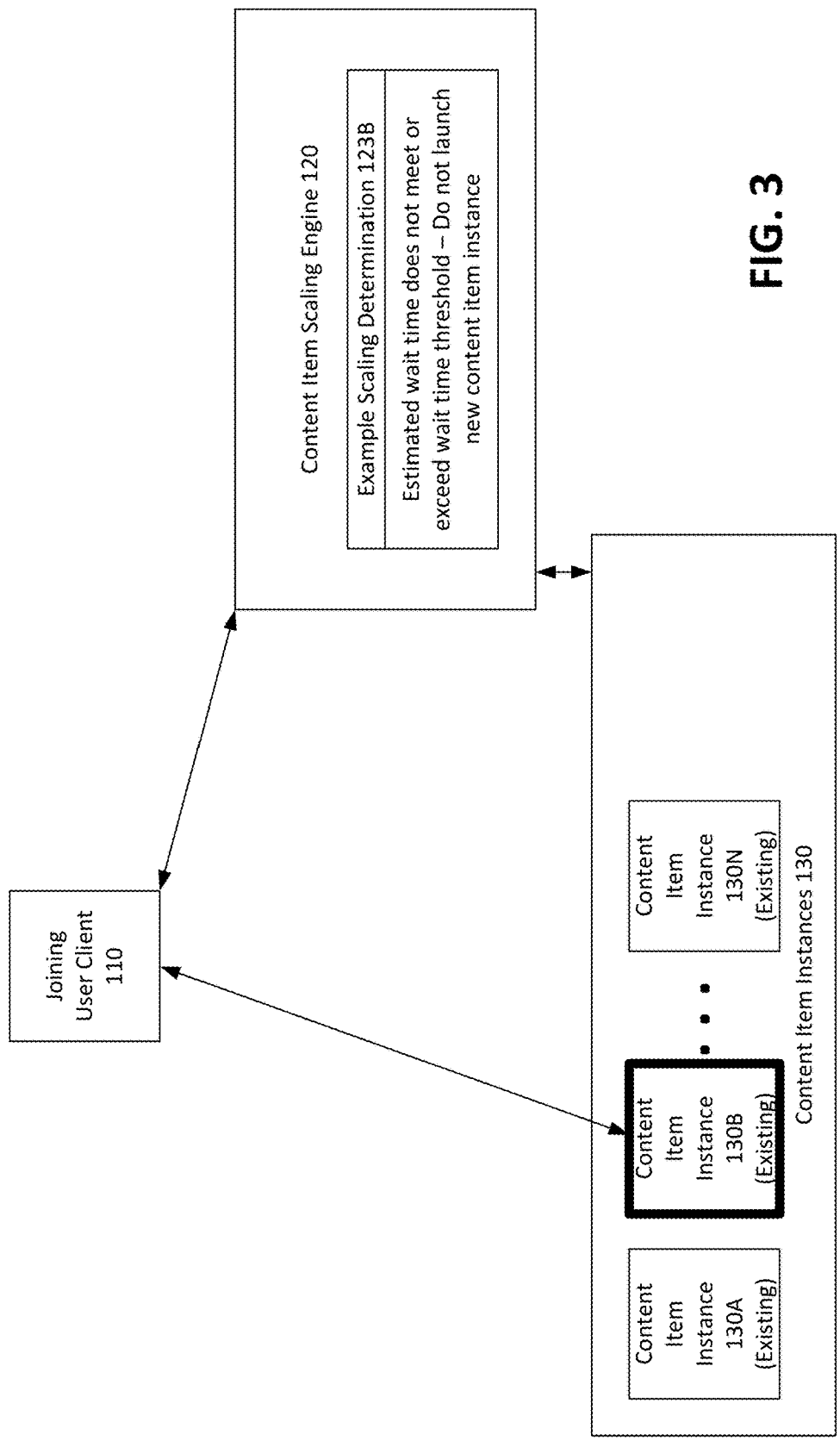
FIG. 3 is a diagram illustrating another example wait time based scaling determination that may be used in accordance with the present disclosure.

Referring now to FIG. 3, an example scaling determination 123B is shown in which content item scaling engine 120 determines that the estimated wait time 122 does not meet or exceed the wait time threshold 121. In this example, scaling determination 123B may include a determination not to launch a new instance in response to the join request from joining user client 110. In some cases, upon making this determination 123B, content item scaling engine 120 may continue to monitor existing content item instances 130A-N, for example until it is determined that an open slot has become available on one of content item instances 130A-N. This may occur, for example, when an existing user session terminates on a content item instance 130A-N and there are no other queued users that have a higher priority (e.g., are closer to the front of the queue) than the joining user client 110. Content item scaling engine 120 may then assign the joining user client 110 to the existing content item instance for which an open slot has become available. As shown, in the example of FIG. 3, the joining user client 110 is assigned to existing content item instance 130B. Content item scaling engine 120 may also provide instructions to joining user client 110 and/or existing content item instance 130B to connect with one another and initiate a new user session for the joining user client 110. It is noted that, in some examples, other additional content item instances (not shown in FIG. 3) may also be launched while the joining user client 110 is waiting to join, and the joining user client 110 may be possibly assigned to one of those additional content item instances.

Thus, as set forth above, a scaling determination 123 may be made by content item scaling engine 120 based at least in part on a comparison between the estimated wait time 122 and the wait time threshold 121. In some examples, the calculation of the estimated wait time 122 may be based on a number of different factors, such as a time of day, a day of the week, a date, a location associated with the joining user and/or at least one content item instance, a quantity of users of at least one content item instance, a quantity of available content item instances, an elapsed session duration of at least one user, an estimated session duration of at least one user, an elapsed duration of at least one content item instance, a number of other users waiting to join at least one content item instance, user game modes, time required to launch a new content item instance (e.g., spin-up time), one or more historical wait times (e.g., average wait times over one or more historical periods), historical user quantity data (e.g., at various times and elapsed content item instance durations), historical user session duration data, historical content item instance launch (e.g., spin-up) time data, and others.

In some examples, the estimated wait time 122 may be calculated based, at least in part, on current (e.g., recently updated) wait time data 151 and historical wait time data 152. Referring back to FIG. 1, it is seen that current wait time data 151 and historical wait time data 152 may be provided to content item scaling engine 120 by wait time data collection components 150. In general, wait time data collection components 150 may collect, aggregate, store, update, and provide wait time-related data, for example from components such as content item instances 130, existing/queued user clients 140, joining user client 110, and others.

Current (e.g., recently updated) wait time data 151 may include data related to current (or recently updated) states of content item instances 130, existing/queued user game clients 140, and other components. In some examples, current wait time data 151 may include data such as a location associated with at least one of the content item instances 130A-N, a quantity of users of at least one of the content item instances 130A-N, an elapsed session duration of at least one of the users, an elapsed duration of at least one of the content item instances 130, a number of queued users waiting to join at least one of the content item instances 130, and other data. In some cases, content item instances 130A-N and/or clients 110 and 140 may include instructions for reporting of wait time-related data to wait time data collection components 150. For example, in some cases, content item instances 130A-N and/or clients 110 and 140 may be developed based on instructions associated with a software development kit (SDK), application programming interface (API) or other information that includes instructions for reporting of wait time related data to wait time data collection components 150. Specifically, this information may include instructions for reporting of various types wait time related data (e.g., various data attributes or characteristics), for example at specified intervals and/or using various specified protocols or formats. In some examples, such an SDK, API, or other information may be associated with and/or provided by a computing service provider that hosts and operates the developer's content item instances 130 on behalf of the developer. Also, in some examples, wait time data collections components 150 may communicate with instances 130, clients 110 and 140, and/or other components to request various wait time related data. Wait time related data may be updated, reported, requested, or otherwise collected at any desired regular or irregular intervals.

Historical wait time data 152 may include, for example, wait time related data that is collected over time, aggregated, updated, and/or stored. In some examples, historical wait time data 152 may include data reflecting various wait time patterns for one or more content items over one or more historical periods. For example, in some cases, historical wait time data 152 may include data regarding observed wait times for one or more content items over one or more historical periods. This data may be used, for example, to calculate one or more average historical wait times. In some examples, these average historical wait times may correspond to an entire content item history and/or may be unique to various periods (e.g., time of day, date, location, etc.). For example, in some cases, a first historical average wait time may be determined for a particular content item on weekday evenings, while a second historical average wait time may be determined for a particular content item on weekend afternoons, and other historical average wait times may be calculated for other dates and times. As should be appreciated, calculation of these multiple historical average wait times over different periods may sometimes enable more precise and reliable wait time estimations.

Figure 4:
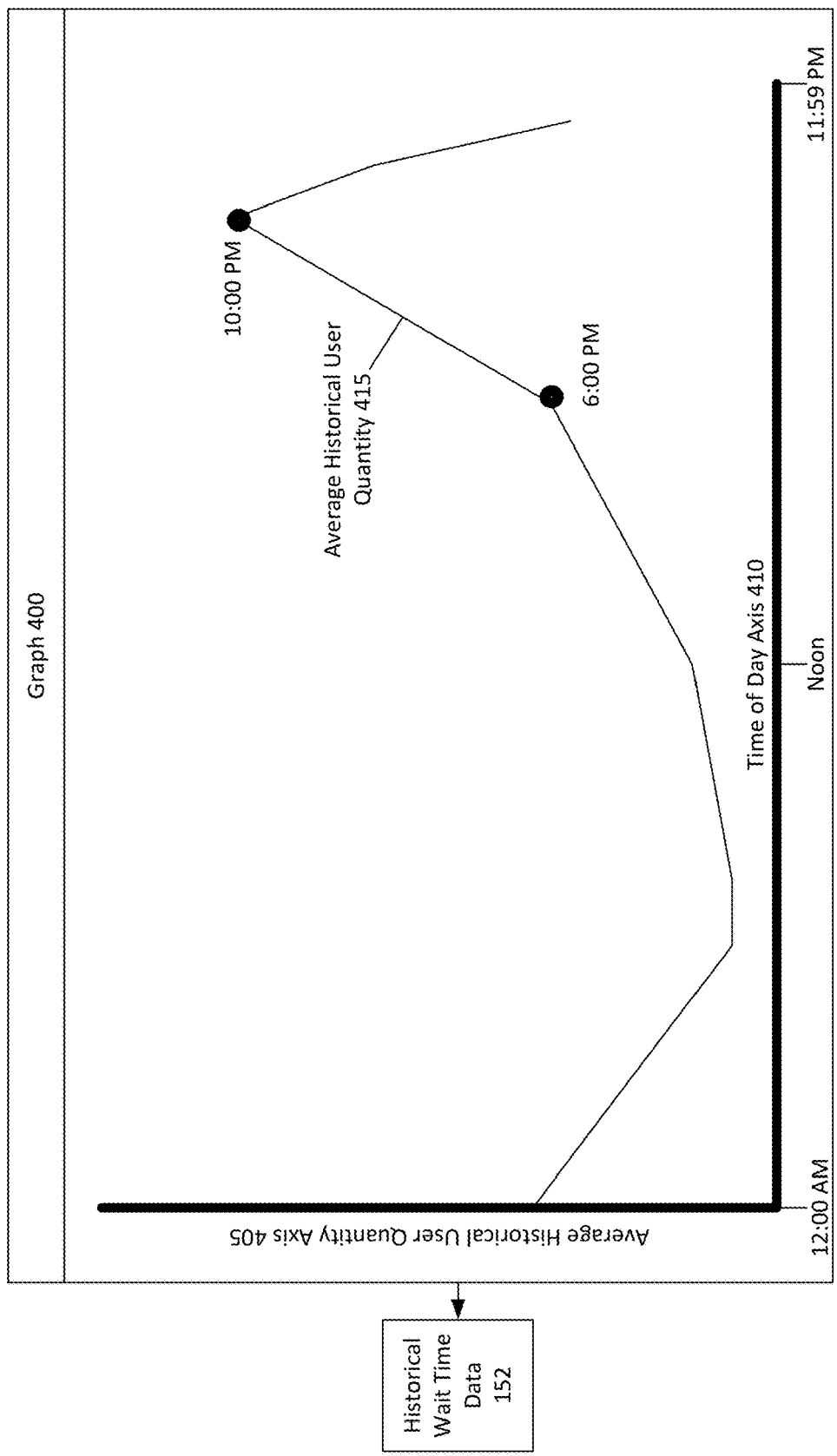
FIG. 4 is a diagram illustrating an example graph representing an example portion of historical wait time data that may be used in accordance with the present disclosure.

Historical wait time data 152 may also include, for example, data regarding usage patterns for one or more content items over one or more historical periods (e.g., time of day, date, location, etc.). In some cases, historical wait time data 152 may include data indicating historical user quantities and/or user session durations for one or more content items at different times of day, dates, locations, and the like. For example, historical wait time data 152 may be used to determine an average quantity of users for a game at different times (e.g., noon, 6:00 P.M., 10:00 P.M., etc.) on different days (e.g., weekdays, weekends, holidays, etc.), at different geographic locations or regions, and the like. Referring now to FIG. 4, a graph 400 is shown that provides an example graphical representation of average historical user quantities in relation to different times of day. In particular, graph 400 includes a horizontal time of day axis 410 and a vertical average historical user quantity axis 405 and indicates average historical user quantity 415 at different times of day. In the particular example of FIG. 4, it is shown that average historical user quantity 415 experiences a sharp increase beginning at 6:00 P.M., which, in some examples, may be associated with many people returning home from work and having personal time that can be used to play a video game or other content item. Also, in the particular example of FIG. 4, it is shown that average historical user quantity 415 experiences a sharp decrease beginning at 10:00 P.M., which, in some examples, may be associated with many users terminating their content item sessions so that they can go to sleep for the night. It is noted that graph 400 is merely intended to provide an example representation of certain types of historical wait time data 152 that may be collected and aggregated and is not necessarily intended to represent any actual usage patterns for any particular content items.

In some examples, average historical user quantity data such as represented by graph 400 may be used to help calculate an estimated wait time 122 when a join request is received from joining user client 110. For example, if a join request is received just after 6:00 P.M., it may be determined, based on data represented by graph 400, that user quantity is sharply increasing at that time, which, in some cases, may generally result in calculation of a longer estimated wait time 122. By contrast, if a join request is received just after 10:00 P.M., it may be determined, based on data represented by graph 400, that user quantity is sharply decreasing at that time, which, in some cases, may generally result in calculation of a shorter estimated wait time 122.

Figure 5:
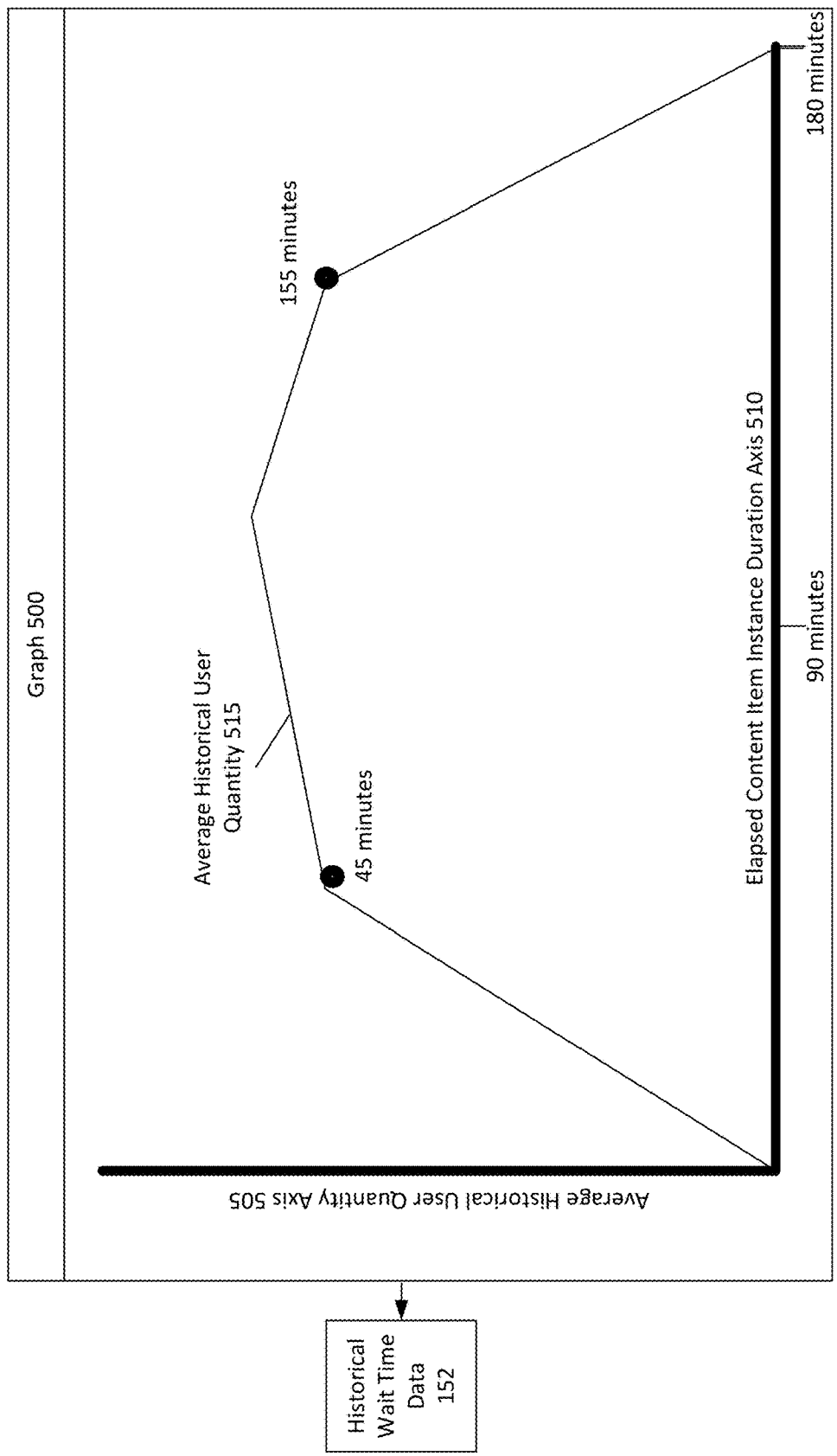
FIG. 5 is a diagram illustrating another example graph representing another example portion of historical wait time data that may be used in accordance with the present disclosure.

Additionally, in some examples, historical wait time data 152 may also include data indicating historical user quantities and other usage patterns at different stages within a content item instance lifecycle. In some cases, historical wait time data 152 may include data indicating average historical user quantities at various elapsed durations of one or more content item instances. Referring now to FIG. 5, a graph 500 is shown that provides an example graphical representation of average historical user quantities in relation to different elapsed content item instance durations. In particular, graph 500 includes a horizontal elapsed content item instance duration axis 510 and a vertical average historical user quantity axis 505 and indicates average historical user quantity 515 at different elapsed content item instance durations. In the particular example of FIG. 5, results are shown for 180 minutes of elapsed time duration, which may correspond to an average historical duration for instances of the content item for which data is shown in graph 500. It is shown that average historical user quantity 515 increases sharply for the first 45 minutes of elapsed content item instance duration. Additionally, it is shown that average historical user quantity 515 decreases sharply between 155 and 180 minutes of elapsed content item instance duration. It is noted that graph 500 is merely intended to provide an example representation of certain types of historical wait time data 152 that may be collected and aggregated and is not necessarily intended to represent any actual usage patterns for any particular content items. Also, in some examples, certain content item instances may be limited to a particular time period or may include certain events (e.g., battles, melees, competitions, etc.) that are limited to particular time periods. Information about the known limited time periods of certain content item instances and events may also be used to calculate the estimated wait time 122. For example, in some cases, it can be determined that, at the conclusion of a certain competition, melee or other content item instance or event, that one or more slots will become available.

In some examples, average historical user quantity data such as represented by graph 500 may also be used to help calculate an estimated wait time 122 when a join request is received from joining user client 110. For example, in some cases, upon receiving of the join request, an elapsed instance duration may be determined for one or more of the existing content item instances 130A-N. Estimated wait times for one or more of the existing content item instances 130A-N may then be calculated based, at least in part, on comparisons of their elapsed instance duration with average historical user quantity data, such as represented by graph 500. In particular, based on the particular example of graph 500, it may be determined that a longer estimated wait time 122 may generally be calculated for content item instances having an elapsed duration of less than 45 minutes, for example because they tend to experience a sharp increase in user quantities. By contrast, based on the particular example of graph 500, it may be determined that a shorter estimated wait time 122 may generally be calculated for content item instances having an elapsed duration of more than 155 minutes, for example because they tend to experience a sharp decrease in user quantities.

Also, in some examples, historical wait time data 152 may include historical user session duration data, such as average historical content item session durations over one or more historical periods. For example, this data may indicate average historical content item session durations for users at various times of day, days, dates, locations, etc. In some examples, this data may be collected and/or aggregated for all users, for users matching certain characteristics, and/or for individual users. In some examples, this data may be used to determine an estimated session duration for one or more existing users that are currently playing one or more existing content item instances 130A-N. For example, consider the scenario in which a request to join a particular content item is received at 6:00 P.M. on a weekday. In some examples, based on historical wait time data 152, it may be determined that a historical average user session duration for users of that game at 6:00 P.M. on a weekday is 30 minutes. Thus, in some examples, 30 minutes may be determined to be an estimated user session duration for use in calculation of the estimated wait time. Now suppose that it is determined that the elapsed duration of the longest existing user session for existing content item instances of that content item is 29 minutes. In some examples, based on this information, the estimated wait time may be calculated to be 1 minute, which is the difference between the historical average user session duration (30 minutes) and the elapsed duration of the longest existing user session (29 minutes).

Historical user session duration data may also be used in other ways to calculate the estimated wait time. For example, in some cases, when a user join request is received for a content item, it may be determined that a particular user, referred to in this example as User X, has the longest existing user session for existing instances of that content item and that the current elapsed duration of User X's session is 35 minutes. Also, in this example, it may be determined, based on historical wait time data 152, that the historical average user session duration for User X is 40 minutes. In some examples, based on this information, the estimated wait time may be calculated to be 5 minutes, which is the difference between User X's historical average user session duration (40 minutes) and the elapsed duration of User X's existing user session (35 minutes).

Additionally, in some examples, historical wait time data 152 may also be used for purposes of selecting the wait time threshold 121. For example, in some cases, wait time data collection components 150 may collect historical data from joining user clients regarding the durations of their wait times and the outcomes of those wait times, such as whether the joining user continued to wait to be connected to a content item instance or became frustrated with the wait time and chose to disconnect from the system prior to being connected to a content item instance. This and other data may be provided, for example to customer 160, for use in selecting the wait time threshold. In some cases, the data may be used to determine certain historical wait time thresholds at which large increases in joining user disconnections have occurred. For example, consider the scenario in which the data indicates that, for wait time of less than twenty minutes, only ten percent of joining users disconnected from the system prior to being connected to a content item instance, while, for wait time of greater than twenty minutes, sixty percent of joining users disconnected from the system prior to being connected to a content item instance. Such data may be used intelligently by the customer 160, for example to avoid selecting a wait time threshold 121 of twenty minutes or more.

Thus, as described above, historical wait time data 152 and current wait time data 151 may, in some examples, be used to calculate an estimated wait time 122 and a wait time threshold 121 for a content item instance to become available to a joining user client 110. It is noted that, in some examples, different content item instances may sometimes be determined to have different levels of correlation to the joining user client 110. For example, in some cases, various joining user content item preferences may be associated with a joining user. In some cases, these preferences may be specified in the user's join request or may be otherwise determined or inferred based on information associated with the user. For example, in some cases, it may be desirable to assign a joining user to a content item instance having an associated location (e.g., a location of one or more physical devices that execute the content item instance) that is in close geographic proximity to the joining user. Having a close geographic proximity between a user and a game instance may often reduce latency and improve responsiveness. In these scenarios, content item instances having closer locations to the joining user may sometimes be considered to have a stronger correlation to the joining user, while content item instances having locations that are further from the joining user may sometimes be considered to have a weaker correlation to the joining user. Also, in some examples, a joining user may sometimes indicate one or more content item preferences, for example via the join request or other means. These preferences may include, for example, a maximum, minimum, or other desired quantity of players of other users, elapsed time duration, skill level, virtual locations, or battles, and other preferences. Similarly, in these scenarios, content item instances that more closely correspond to these preferences may sometimes be considered to have a stronger correlation to the joining user, while content item instances that less closely correspond to these preferences may sometimes be considered to have a weaker correlation to the joining user.

Figure 6:
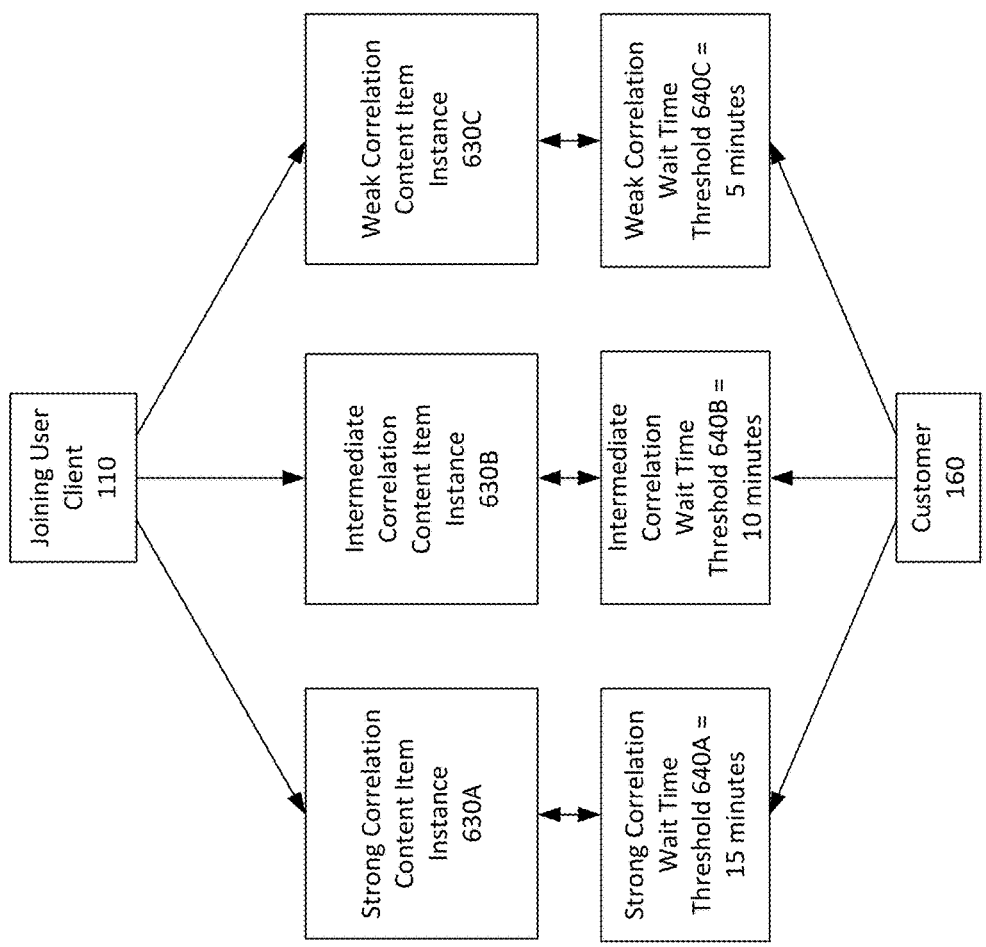
FIG. 6 is a diagram illustrating example correlation-based wait time thresholds that may be used in accordance with the present disclosure.

In some examples, a customer may choose to vary the wait time threshold 121 based, at least in part, on one or more amounts of correlation between one or more content item instances and a joining user. For example, in some cases, a customer may select different wait time thresholds 121 for content item instances having different levels or other amounts of correlation to a joining user. As set forth above, an amount or level of correlation between a content item instance and a joining user may, for example, be based on a quantity, percentage, or other amount correlation between characteristics of the content item instance and preferences or other characteristics of the joining user. Referring now to FIG. 6, an example is shown in which a customer 160 has selected three different wait time thresholds 640A-C. In particular, in this example, strong correlation wait time threshold 640A, which is for content item instances having strong correlations to the joining user, is set at fifteen minutes. Intermediate correlation wait time threshold 640B, which is for content item instances having intermediate correlations to the joining user, is set at ten minutes. Weak correlation wait time threshold 640C, which is for content item instances having weak correlations to the joining user, is set at five minutes. As also shown in FIG. 6, strong correlation content item instance 630A is determined to have a strong correlation to the joining user, and is therefore associated with respective strong correlation wait time threshold 640A. Intermediate correlation content item instance 630B is determined to have an intermediate correlation to the joining user, and is therefore associated with respective intermediate correlation wait time threshold 640B. Weak correlation content item instance 630C is determined to have a weak correlation to the joining user, and is therefore associated with respective weak correlation wait time threshold 640C. In some examples, if the estimated wait times for any or all of instances 630A-C are determined to meet or exceed their associated wait time thresholds 640A-C, respectively, then a determination may be made to launch a new content item instance. By contrast, in some examples, if the estimated wait times for any or all of instances 630A-C are determined to not meet or exceed their associated wait time thresholds 640A-C, respectively, then a determination may be made to not launch a new content item instance and assign the joining user to an existing instance or another content item instance when an open slot becomes available. It is noted that FIG. 6 is merely intended to provide a non-limiting example of how the wait time threshold can be varied based on content item instance and joining user correlation and that different methods may be employed in accordance with the disclosed techniques. For example, in some cases, rather than specifically identifying multiple different wait times, the customer may provide other instructions for varying the wait time threshold to result in multiple different wait time thresholds. In particular, as set forth above, a longer wait time threshold may sometimes be employed for content item instances having a strong correlation to a joining user, such as a maximum, minimum, or other quantity of players, an elapsed time duration, a skill level, a virtual location, a battle, and/or other attributes that match preferences of a joining user.

Figure 7:
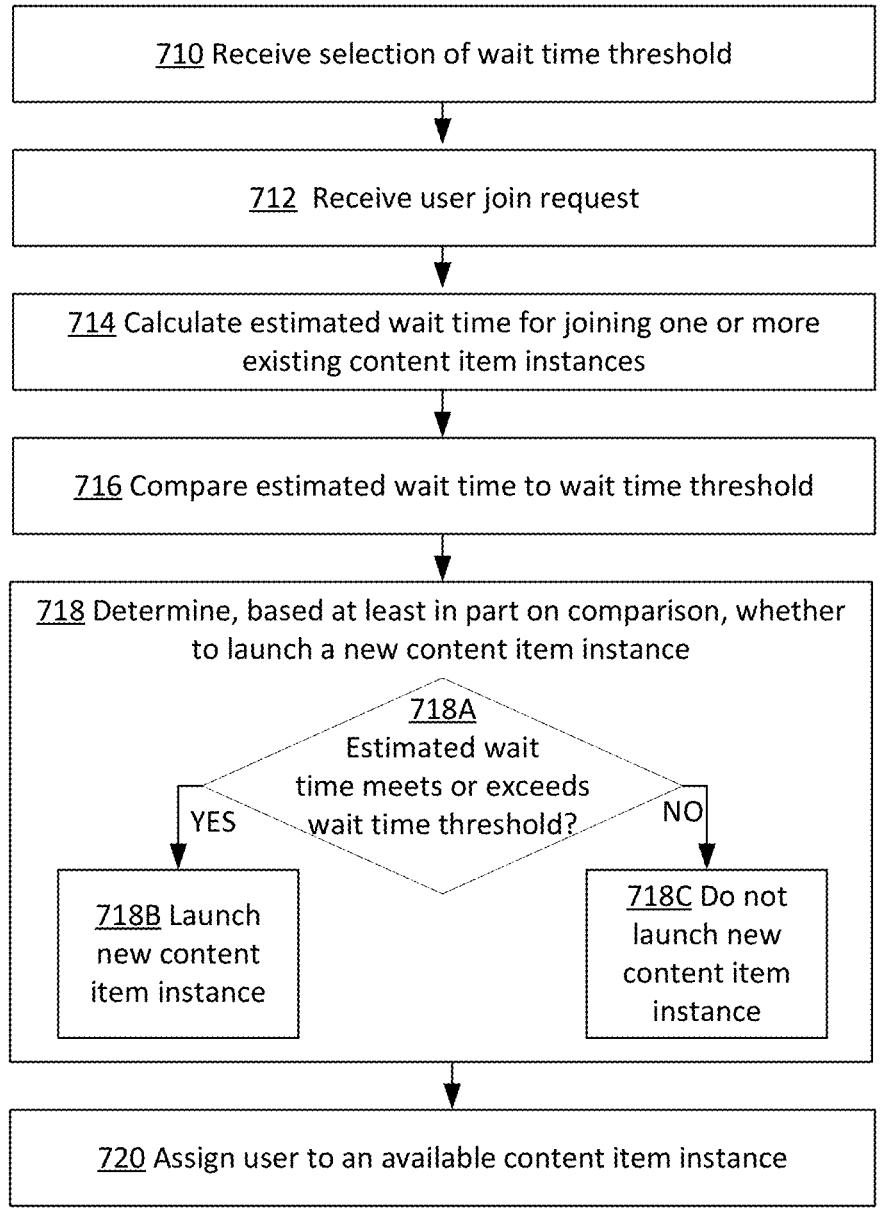
FIG. 7 is a flowchart illustrating an example wait time based content item instance scaling process that may be used in accordance with the present disclosure.

Thus, as set forth above, a number of techniques may be employed for selecting one or more wait time thresholds 121 for use in intelligent scaling of content item instances. Referring now to FIG. 7, an example wait time based content item instance scaling process will now be described in detail. In particular, the example process of FIG. 7 is initiated at operation 710, at which a selection of a wait time threshold associated with joining of content item instances is received. For example, the selected wait time threshold may be selected by a game developer or other customer and received by a content item scaling engine 120. As set forth above, selection of a longer wait time threshold may generally reduce the number of content item instances allocated to a customer over time, which may reduce costs for the customer. However, a longer wait time threshold may also result in longer wait times for users. By contrast, selection of a shorter wait time threshold may reduce wait times for users, thereby generally improving their enjoyment of the content item. However, selection of a shorter wait time threshold may also increase costs for the customer. Thus, selection of the wait time threshold may be based, at least in part, on these and other trade-offs. However, allowing customers to select a desired wait time threshold may generally be beneficial to customers, for example by allowing customers to flexibly control such trade-offs at levels that are best suited to satisfy their particular preferences. As also set forth above, in some cases, the wait time threshold may be selected based on historical wait time data, for example regarding the duration of historical user wait times and the outcomes of those wait times, such as whether the joining user continued to wait to be connected to a content item instance or became frustrated with the wait time and chose to disconnect from the system prior to being connected to a content item instance. Additionally, it is noted that, in some examples, a selection of multiple different wait time thresholds and/or other instructions for varying the wait time threshold may be received, for example in scenarios where the wait time threshold is varied based on a correlation between joining users and content item instances.

At operation 712, a user join request is received, such as a request for a player or other user to join a video game or other content item. The join request may be received, for example, by content item scaling engine 120. As set forth above, in some examples, the join request may indicate certain preferences or other characteristics for a content item instance to which the user would like to be assigned, such as a preferred number of users, elapsed duration, virtual locations or battles, and the like.

At operation 714, an estimated wait time for joining one or more existing content item instances is calculated. As set forth above, the estimated wait time may be calculated based, at least in part, on data collected from one or more content item instances, one or more content item clients (e.g., joining user content item clients, queued user content item clients, and existing user content item clients), and/or other sources. As also set forth above, the estimated wait time may be calculated based, at least in part, on factors such as a time of day, a day of the week, a date, a location associated with at least one of the user or at least one content item instance, a number of users of at least one content item instance, a quantity of available content item instances, an elapsed session duration of at least one of the users, an estimated session duration of at least one of the users, an elapsed duration of at least one content item instance, a number of other users waiting to join at least one content item instance, game modes, time required to launch a new content item instance (e.g., spin-up time), and/or other factors. In particular, in some examples, the estimated wait time may be calculated based, at least in part, on current (e.g., recently updated) wait time data and/or historical wait time data. In some examples, the historical wait time data may include historical wait time duration data, historical user quantity data, historical content item instance launch (e.g., spin-up) time data, and/or historical user session duration data. Also, in some examples, the historical user quantity data may indicate historical user quantities in relation to times of day, days of the week, dates, elapsed content item instance session durations, and/or other attributes. As set forth above, in some cases, the estimated wait time may be calculated based, at least in part, on a difference between an elapsed duration of an existing user session and an estimated user session duration. Also, in some examples, multiple estimated wait times may be calculated, for example for different content item instances having different amounts of correlation to the joining user.

At operation 716, a comparison of the estimated wait time to the wait time threshold is performed, for example to determine whether the estimated wait time meets or exceeds the wait time threshold. In some examples, operation 716 may also include comparing multiple different estimated wait times to multiple different wait time thresholds. As set forth above, this may occur, for example, when multiple different wait time thresholds are associated with multiple different content item instances based, at least in part, on an amount of correlation between characteristics associated with the content item instances and characteristics (e.g., preferences) associated with the joining user, such as shown in the example of FIG. 6.

At operation 718, a determination is made, based at least in part on the comparison performed at operation 716, of whether to launch a new content item instance in response to the join request. For example, operation 718 may include a determination 718A of whether the estimated wait time meets or exceeds the wait time threshold. In some examples, if the estimated wait time meets or exceeds the wait time threshold (or if any or all of a plurality of estimated wait times meet or exceed any or all of a plurality of wait time thresholds), and then a determination 718B may be made to launch a new content item instance in response to the join request. For example, in some cases, the content item scaling engine may provide instructions to allocate a new virtual machine instance to the customer and to launch the new content item instance on the new virtual machine instance or to launch the new content item instance on an existing virtual machine instance already allocated to the customer and possibly already executing one or more other content item instances. By contrast, in some examples, if the estimated wait time does not meet or exceed the wait time threshold (or if any or all of a plurality of estimated wait times do not meet or exceed any or all of a plurality of wait time thresholds), then a determination 718C may be made not to launch a new content item instance in response to the join request.

At operation 720, the joining user is assigned to an available content item instance. In some examples, the joining user may be assigned to an available content item instance based, at least in part, on whether a new content item instance is launched in response to the join request. For example, in some cases, if a new content item instance is launched in response to the join request, then, at operation 720, the joining user may be assigned to the new content item instance. The content item scaling engine may also provide instructions to the joining user client and/or the new content item instance to connect with one another and initiate a new user session for the joining user once the new content item instance has been successfully launched and loaded. Also, in some examples, the joining user may not immediately be assigned to the new content item instance but may instead be added into a queue with other waiting users to join a next available content item instance, which may be the new content item instance or another content item instance.

By contrast, in some examples, if a new content item instance is not launched in response to the join request, then, at operation 720, the joining user may be assigned to an existing content item instance or another content item instance. For example, in some cases, the user may be added to a queue with other waiting users, and the content item scaling engine may continue to monitor content item instances until it is determined that an open slot has become available on one of the monitored content item instances. This may be based, at least in part, on an existing user session terminating on a content item instance, such as when an existing user session terminates and there are no other queued users that have a higher priority (e.g., are closer to the front of the queue) than the joining user. The content item scaling engine may then assign the joining user to the available content item instance for which an open slot has become available.

Figure 8:
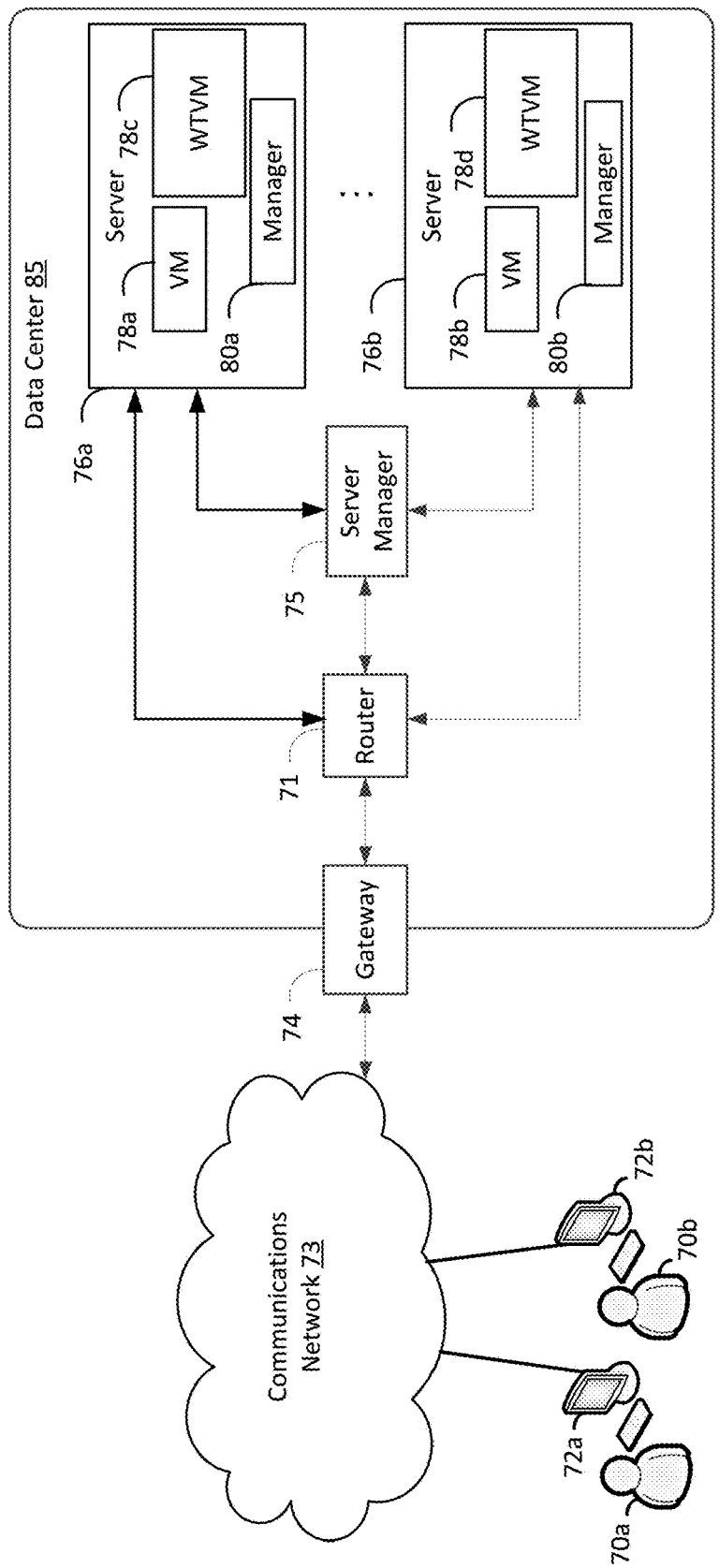
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are wait time virtual machine ("SSVM") instances. The WTVM virtual machine instances 78c and 78d may be configured to perform all, or any portion, of the techniques for wait time based content item instance scaling and/or any other of the disclosed techniques in accordance with the present disclosure and described in detail above. As should be appreciated, while the particular example illustrated in FIG. 8 includes one WTVM virtual machine in each server, this is merely an example. A server may include more than one WTVM virtual machine or may not include any WTVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
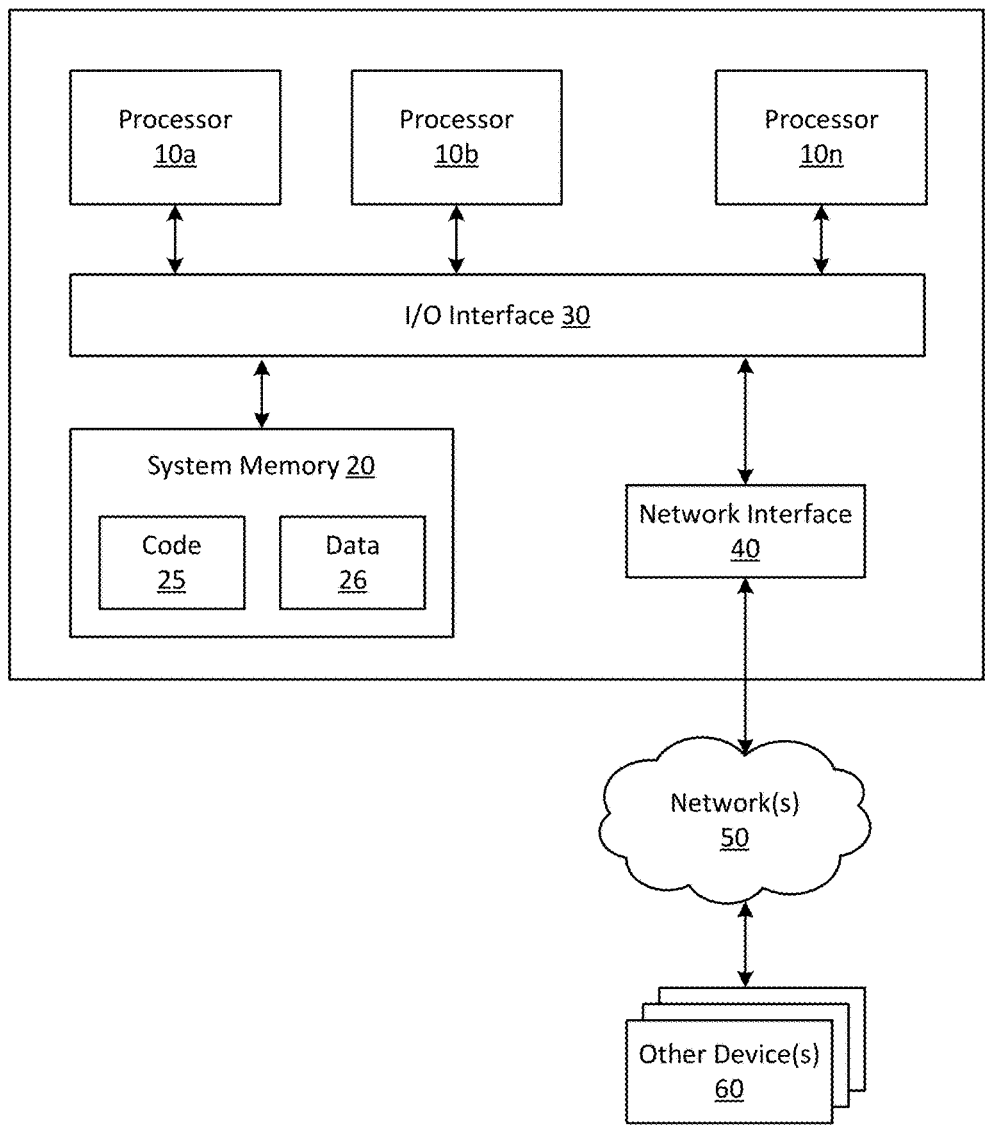
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for wait time based scaling of video game instances comprising:
    one or more processors; and
    one or more memories having stored therein instructions that, upon execution by the one or more processors, cause the computing system to perform operations comprising:
        receiving a selection of a wait time threshold associated with joining of the video game instances;
        receiving a request for a user to join a video game;
        calculating an estimated wait time for joining one or more existing video game instances, wherein the estimated wait time is calculated based at least in part on data that includes a first average historical quantity of users of the video game at a first elapsed duration of the video game and a second average historical quantity of users of the video game at a second elapsed duration of the video game, wherein the data indicates an increase or a decrease in user quantity from the first elapsed duration to the second elapsed duration;
        performing a comparison of the estimated wait time to the wait time threshold;
        determining, based at least in part on the comparison, whether to launch a new video game instance in response to the request, wherein the determining comprises:
            determining to launch the new video game instance when the estimated wait time meets or exceeds the wait time threshold; and
            determining not to launch the new video game instance when the estimated wait time does not meet or exceed the wait time threshold; and
        assigning the user to an available video game instance.

2. The computing system of claim 1, wherein the estimated wait time is calculated based, at least in part, on at least one of a time of day, a day of a week, a date, a location associated with at least one of the user or at least one video game instance, a quantity of first users of at least one video game instance, a quantity of available video game instances, an elapsed session duration of at least one of the first users, an estimated session duration of at least one of the first users, time required to launch the new video game instance, or a quantity of second users waiting to join at least one video game instance.

3. The computing system of claim 1, wherein the estimated wait time is calculated based, at least in part, on additional historical data.

4. The computing system of claim 3, wherein the additional historical data comprises at least one of historical wait time duration data, historical content item instance launch time data, or historical user session duration data.

5. A method for wait time based scaling of content item instances comprising:
    receiving a selection of a wait time threshold associated with joining of the content item instances;
    receiving a request for a user to join a content item;
    calculating an estimated wait time for joining one or more existing content item instances, wherein the estimated wait time is calculated based at least in part on data that includes a first average historical quantity of users of the content item at a first elapsed duration of the content item and a second average historical quantity of users of the content item at a second elapsed duration of the content item, wherein the data indicates an increase or a decrease in user quantity form the first elapsed duration to the second elapsed duration;
    performing a comparison of the estimated wait time to the wait time threshold;
    determining, based at least in part on the comparison, whether to launch a new content item instance in response to the request; and
    assigning the user to an available content item instance.

6. The method of claim 5, wherein the determining comprises:

determining to launch the new content item instance when the estimated wait time meets or exceeds the wait time threshold; and determining not to launch the new content item instance when the estimated wait time does not meet or exceed the wait time threshold.

7. The method of claim 5, wherein the estimated wait time is calculated based, at least in part, on data collected from one or more content item instances or one or more content item clients.

8. The method of claim 5, wherein the estimated wait time is calculated based, at least in part, on at least one of a time of day, a day of a week, a date, a location associated with at least one of the user or at least one content item instance, a quantity of first users of at least one content item instance, a quantity of available content item instances, an elapsed session duration of at least one of the first users, an estimated session duration of at least one of the first users, time required to launch the new content item instance, or a quantity of second users waiting to join at least one content item instance.

9. The method of claim 5, wherein the estimated wait time is calculated based, at least in part, on additional historical data.

10. The method of claim 9, wherein the additional historical data comprises at least one of historical wait time duration data, historical content item instance launch time data, or historical user session duration data.

11. The method of claim 9, wherein the additional historical data indicates historical user quantities in relation to at least one of times of day, days of a week, or dates.

12. The method of claim 5, wherein the estimated wait time is calculated based, at least in part, on a difference between an elapsed duration of an existing user session and an estimated user session duration.

13. The method of claim 5, further comprising:
receiving instructions for varying of the wait time threshold to result in a plurality of wait time thresholds; and
calculating a plurality of estimated wait times,
wherein a determination is made not to launch the new content item instance based on at least one of plurality of wait times being less than an associated one of the plurality of wait time thresholds.

14. The method of claim 13, wherein the plurality of wait time thresholds are associated with a plurality of content item instances based, at least in part, on an amount of correlation between characteristics associated with the plurality of content item instances and characteristics associated with the user.

15. The method of claim 5, wherein the assigning the user to an available content item instance comprises assigning the user to an existing content item instance based, at least in part, on an existing user session terminating on the existing content item instance.

16. One or more non-transitory computer-readable storage media having stored thereon instructions that, upon execution by one or more compute nodes, cause the one or more compute nodes to perform operations comprising:
receiving a selection of a wait time threshold associated with joining of content item instances;
receiving a request for a user to join a content item;
calculating an estimated wait time for joining one or more existing content item instances, wherein the estimated wait time is calculated based at least in part on data that includes a first average historical quantity of users of the content item at a first elapsed duration of the content item and a second average historical quantity of users of the content item at a second elapsed duration of the content item, wherein the data indicates an increase or a decrease in user quantity form the first elapsed duration to the second elapsed duration;
performing a comparison of the estimated wait time to the wait time threshold;
determining, based at least in part on the comparison, whether to launch a new content item instance in response to the request; and
assigning the user to an available content item instance.

17. The one or more non-transitory computer-readable storage media of claim 16, wherein the determining comprises:
determining to launch the new content item instance when the estimated wait time meets or exceeds the wait time threshold; and
determining not to launch the new content item instance when the estimated wait time does not meet or exceed the wait time threshold.

18. The one or more non-transitory computer-readable storage media of claim 16, wherein the estimated wait time is calculated based, at least in part, on at least one of a time of day, a day of a week, a date, a location associated with at least one of the user or at least one video game instance, a quantity of first users of at least one video game instance, a quantity of available content item instances, an elapsed session duration of at least one of the first users, an estimated session duration of at least one of the first users, time required to launch the new content item instance, or a quantity of second users waiting to join at least one video game instance.

19. The one or more non-transitory computer-readable storage media of claim 16, wherein the estimated wait time is calculated based, at least in part, on additional historical data.

20. The one or more non-transitory computer-readable storage media of claim 19, wherein the additional historical data comprises at least one of historical wait time duration data, historical content item instance launch time data, or historical user session duration data.

* * * * *